(12) United States Patent
Elias et al.

(10) Patent No.: US 8,879,543 B2
(45) Date of Patent: Nov. 4, 2014

(54) METHODS AND APPARATUS TO FORM SECURE CROSS-VIRTUAL PRIVATE NETWORK COMMUNICATION SESSIONS

(71) Applicant: AT&T Intellectual Property I, LP, Atlanta, GA (US)

(72) Inventors: Mark A. Elias, Eastpointe, MI (US); Robert P. Lowmaster, Bartlett, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 14 days.

(21) Appl. No.: 13/783,530

(22) Filed: Mar. 4, 2013

(65) Prior Publication Data
US 2013/0177013 A1    Jul. 11, 2013

Related U.S. Application Data

(63) Continuation of application No. 12/245,320, filed on Oct. 3, 2008, now Pat. No. 8,391,276.

(51) Int. Cl.
  *H04L 12/66* (2006.01)
  *H04L 29/06* (2006.01)
  *H04L 12/715* (2013.01)

(52) U.S. Cl.
  CPC ........ *H04L 65/1069* (2013.01); *H04L 63/0272* (2013.01); *H04L 45/04* (2013.01)
  USPC ........................................................ 370/352

(58) Field of Classification Search
  CPC ......... H04L 45/00; H04L 45/02; H04L 45/22; H04L 45/28; H04L 45/50
  See application file for complete search history.

(56) References Cited

U.S. PATENT DOCUMENTS

| | | |
|---|---|---|
| 2005/0025069 A1* | 2/2005 | Aysan .......................... 370/254 |
| 2006/0013211 A1 | 1/2006 | Deerman et al. |
| 2006/0146792 A1 | 7/2006 | Ramachandran et al. |
| 2006/0215543 A1 | 9/2006 | Croak et al. |
| 2006/0285493 A1 | 12/2006 | Manuja et al. |
| 2007/0019619 A1 | 1/2007 | Foster et al. |
| 2007/0041527 A1 | 2/2007 | Tuchman et al. |
| 2007/0133406 A1* | 6/2007 | Vasseur ........................ 370/230 |

(Continued)

OTHER PUBLICATIONS

United States Patent and Trademark Office, "Non-Final Office Action," issued in connection with U.S. Appl. No. 12/245,320, mailed Dec. 21, 2011, 11 pages.

(Continued)

*Primary Examiner* — Yong Zhou
(74) *Attorney, Agent, or Firm* — Hanley, Flight & Zimmerman, LLC (57) ABSTRACT

Example methods and apparatus to form secure cross-VPN (virtual private network) communication sessions in multi-protocol label switching (MPLS)-based networks are disclosed. An example method comprises receiving a communication session initiation request from a first device associated with a first MPLS-based VPN, determining whether the communication session initiation request is directed to a second device associated with a second MPLS-based VPN, sending a cross-VPN link setup request to a route reflector to enable a cross-VPN communication path over which the first and second devices are permitted to communicate when the communication session initiation request is directed to the second device associated with the second VPN, and facilitating a communication session between the first and second devices via the communication path enabled by the route reflector.

20 Claims, 6 Drawing Sheets

(56) References Cited

U.S. PATENT DOCUMENTS

| | | |
|---|---|---|
| 2007/0165613 A1 | 7/2007 | Soo et al. |
| 2007/0211715 A1 | 9/2007 | Khouderchah et al. |
| 2007/0211716 A1 | 9/2007 | Oz et al. |
| 2007/0233844 A1* | 10/2007 | Tanimoto ................... 709/223 |
| 2007/0291734 A1 | 12/2007 | Bhatia et al. |
| 2008/0080509 A1* | 4/2008 | Khanna et al. ............... 370/392 |

OTHER PUBLICATIONS

United States Patent and Trademark Office, "Final Office Action," issued in connection with U.S. Appl. No. 12/245,320, mailed Jun. 28, 2012, 11 pages.

United States Patent and Trademark Office, "Notice of Allowance," issued in connection with U.S. Appl. No. 12/245,320, mailed Nov. 2, 2012, 5 pages.

* cited by examiner

METHODS AND APPARATUS TO FORM
SECURE CROSS-VIRTUAL PRIVATE
NETWORK COMMUNICATION SESSIONS

CROSS REFERENCE TO RELATED APPLICATION

This patent is a continuation of and claims priority to U.S. application Ser. No. 12/245,320, filed Oct. 3, 2008, entitled "Methods and Apparatus to Form Secure Cross-Virtual Private Network Communication Sessions," which is hereby incorporated herein by reference in its entirety.

FIELD OF THE DISCLOSURE

This disclosure relates generally to multiprotocol label switching (MPLS)-based networks and, more particularly, to methods and apparatus to form secure cross-VPN (virtual private network) communication sessions in MPLS-based networks.

BACKGROUND

Enterprise customers are increasingly adopting MPLS-based VPN services to implement a communication network among their respective customer sites via a service provider's network. Such MPLS-based VPNs provide direct any-to-any reachability among an enterprise's customer sites. Enterprise customers may, for example, deploy VoIP services to their customer sites via their respective VPNs. Traditionally, cross-VPN communication sessions (such as a VoIP communication session between VoIP devices associated with different VPNs) are established via communication links that are implemented outside of and/or separate from the MPLS-based network that implements the VPNs.

DETAILED DESCRIPTION

Example methods and apparatus to form secure cross-VPN (virtual private network) communication sessions in multi-protocol label switching (MPLS)-based networks are disclosed. A disclosed example method includes receiving a communication session initiation request from a first device associated with a first MPLS-based VPN, determining whether the communication session initiation request is directed to a second device associated with a second MPLS-based VPN, sending a cross-VPN link setup request to a route reflector to enable a cross-VPN communication path over which the first and second devices are permitted to communicate when the communication session initiation request is directed to the second device associated with the second VPN, and facilitating a communication session between the first and second devices via the communication path enabled by the route reflector.

A disclosed example apparatus includes a network interface to receive a communication session initiation request from a first device associated with a first MPLS-based VPN, a protocol processor to determine whether the communication session initiation request is directed to a second device associated with a second MPLS-based VPN, and a border gateway protocol (BGP) engine to send a BGP advertisement to a route reflector to enable a cross-VPN communication path over which the first and second devices are permitted to communicate when the communication session initiation request is directed to the second device associated with the second VPN.

Another disclosed example method includes receiving a cross-VPN link setup request from an application server, the setup request identifying a communication path between two user devices associated with different MPLS-based VPNs, sending a first BGP route advertisement to a first PE router associated with a first of the MPLS-based VPNs, and sending a second BGP route advertisement to a second PE router associated with a second of the MPLS-based VPNs.

Another disclosed example apparatus includes a network interface to receive a cross-VPN link setup request from an application server, the setup request identifying a communication path between two devices associated with different MPLS-based VPNs, and a BGP engine to send a first BGP route advertisement to a first PE router associated with a first of the MPLS-based VPNs, and a second BGP route advertisement to a second PE router associated with a second of the MPLS-based VPNs.

In the interest of brevity and clarity, throughout the following disclosure references will be made to an example MPLS-based network 100 of FIG. 1 and/or to voice over Internet protocol (VoIP) communication sessions. However, the methods and apparatus described herein to form secure cross-VPN communication sessions are applicable to other types of networks constructed using other network technologies, topologies and/or protocols, and/or to other types of communication sessions and/or communication applications.

Figure 1:
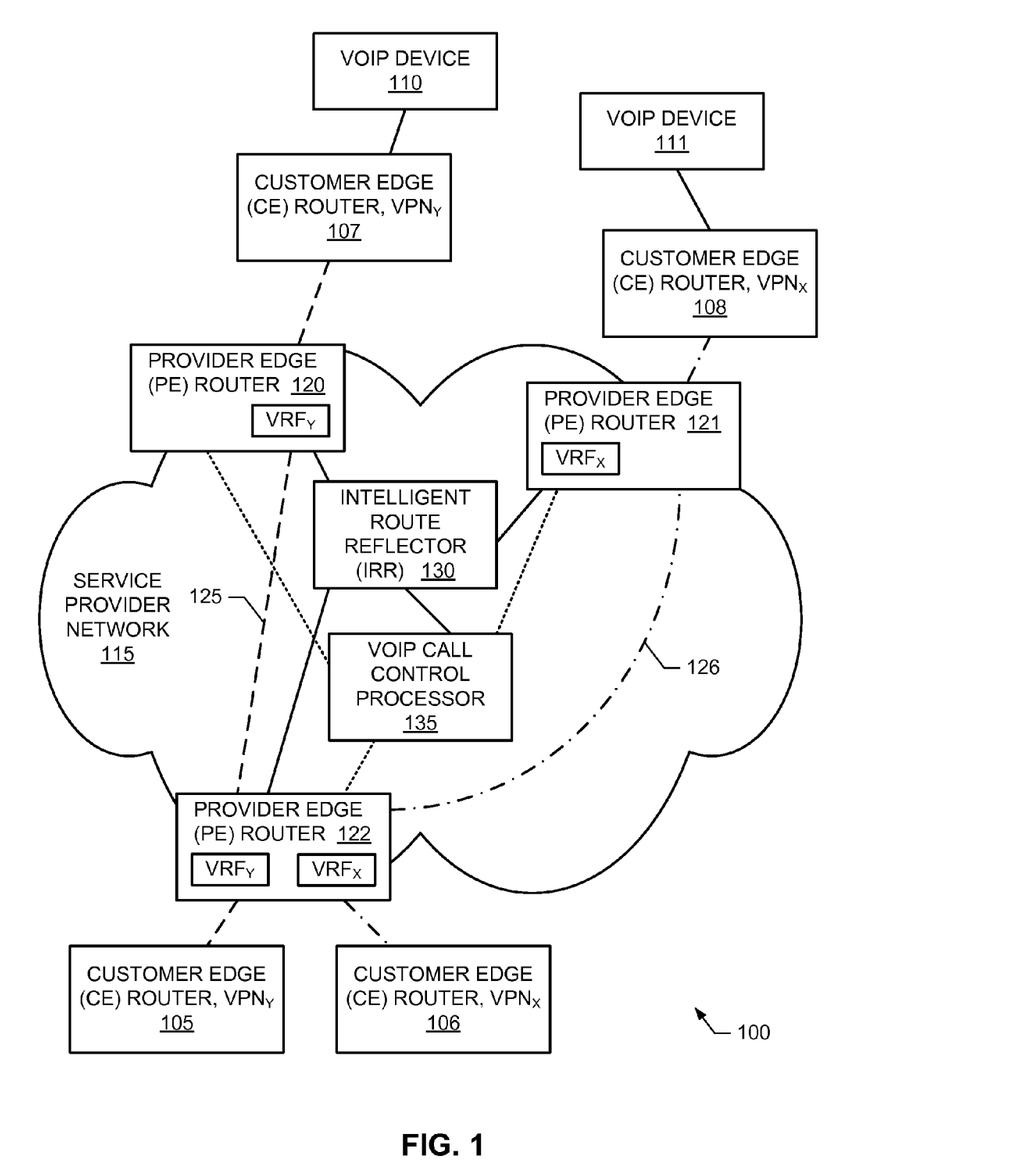
FIG. 1 is a schematic illustration of an example MPLS-based network constructed in accordance with the teachings of this disclosure.

FIG. 1 illustrates the example MPLS-based network 100. To facilitate communication services between a plurality of customer edge (CE) routers (four of which are designated at reference numerals 105, 106, 107 and 108) and/or to a plurality of user devices (two of which are designated at reference numerals 110 and 111), the example MPLS-based network 100 of FIG. 1 includes a service-provider network 115. The example user devices 110 and 111 of FIG. 1 may be any type of user devices including, but not limited to, VoIP endpoints and/or user devices. The example service-provider network 115 of FIG. 1 includes a plurality of PE routers, three of which are designated at reference numerals 120, 121 and 122. The example PE routers 120-122 of FIG. 1 are communicatively coupled to each other via a plurality of communication paths (two of which are designated at reference numerals 125 and 126) that allow a particular PE router 120-122 to communicate with some, but not necessarily all of, the other PE routers 120-122.

For each VPN implemented by the service-provider network 115 (e.g., a VPNx communicatively coupling the CE routers 106 and 108), each of the example PE routers 120-122 of FIG. 1 has a corresponding VRF table (e.g., VRFx for the VPNx coupling the CE routers 106 and 108). The VRF tables are used by the PE routers 120-122 to route and/or forward a packet received at a particular PE router 120-122 to and/or towards its final destination. In general, when a packet is received at a PE router 120-122 from a CE router 105-108, the PE router 120-122 uses the final destination specified and/or identified in the packet to perform a query of its VRF table for the VPN associated with the CE router 105-108. Based on the query, the PE router 120-122 determines how the packet is to be routed or forwarded within the service provider network 115, and/or delivered to a particular CE router 105-108.

To facilitate sharing of routing information among the example PE routers 120-122, the example service provider network 115 of FIG. 1 includes any number of route reflectors, route servers and/or intelligent route reflectors (IRR), one of which is designated at reference numeral 130. Using, for example, BGP route advertisements, each of the example PE routers 120-122 publishes and/or exports information concerning the CE router(s) 105-108 that are communicatively coupled to the PE router 120-122. Such BGP route advertisements are received by the PE router(s) 120-122 that are directly communicatively coupled to the PE router 120-122 that sent the BGP route advertisement. Because not all of the example PE routers 120-122 are necessarily communicatively coupled in a full mesh topology (i.e., at least one PE router 120-122 does not have a direct communication path to another PE router 120-122), the example IRR 130 of FIG. 1 forwards BGP advertisements among and/or to the PE routers 120-122. By forwarding BGP advertisements, the example IRR 130 allows each of the PE routers 120-122 to build, compile and/or construct a VRF table for each VPN that can be used by the PE router 120-122 to route data from any CE router 105-108 of a particular VPN to any other CE router 105-108 of the VPN, even if such routing of data requires use of one or more intervening PE routers 120-122. An example manner of implementing the example IRR 130 of FIG. 1 is described below in connection with FIG. 2.

In the illustrated example of FIG. 1, the importing and/or exporting of particular BGP route advertisements at a PE router 120-122 is defined and/or controlled via route targets. As each VPN is typically associated with a different customer and/or enterprise, a VRF for a particular VPN traditionally only contains routing information for CE routers 105-108 and/or user devices 110 and 111 associated with that VPN. As such, traditional service provider networks do not permit communication between and/or among CE routers 105-108 and/or user devices 110 and 111 associated with different VPNs. When such cross-VPN communication is necessary and/or desired, communication paths between the VPNs are traditionally facilitated via communication paths outside of the service provider network.

To provide and/or implement communication services (e.g., telephone services, VoIP telephony services, Internet services, data services, messaging services, instant messaging services, electronic mail (email) services, chat services, video services, audio services, gaming services, voicemail, facsimile services, etc.) to and/or for user devices (e.g., the example VoIP devices 110 and 111) of the MPLS-based network 100, the example service provider network 115 of FIG. 1 includes any number and/or type(s) of application servers, one of which is designated at reference numeral 135. The example application server 135 of FIG. 1 is a VoIP call control processor, such as a session border controller, that implements the call and/or protocol signaling processing for VoIP telephony services and/or communication sessions. An example manner of implementing the example VoIP call control processor 135 of FIG. 1 is described below in connection with FIG. 3.

When the example VoIP call control processor 135 of FIG. 1 determines that a first VoIP device associated with a first VPN (e.g., the example VoIP device 110 associated with the $VPN_Y$) is initiating a VoIP communication session to a second VoIP device associate with a different VPN (e.g., the example VoIP device 111 associated with $VPN_X$), the VoIP call control processor 135 sends a cross-VPN link setup request to the example IRR 130 to request that a secure and temporary communication path between the two VoIP devices be configured, allowed, permitted and/or enabled. In the illustrated example of FIG. 1, security of the cross-VPN communication path is maintained by configuring the cross-VPN communication path to be useable only by the two VoIP devices and only for a particular type of communication protocol and/or communication session (e.g., a VoIP telephone call). By opening the cross-VPN communication path only between particular VoIP devices, for only a particular communication protocol and/or communication session, and/or only on a temporary basis, the security of the two involved VPNs is preserved.

In the illustrated example of FIG. 1, the cross-VPN link setup request sent by the example VoIP call control processor 135 to the example IRR 130 contains: (a) a BGP community value that represents the PE routers 120-122 associated with the desired cross-VPN communication path, (b) the IP addresses of the involved user devices 110 and 111, and (c) one or more flow-spec parameters that represent the permitted and/or allowable communication protocols and/or communication sessions that may occur via the cross-VPN communication path. When the requested communication session ends, the example VoIP call control processor 135 sends a cross-VPN link termination request that causes the example IRR 130 to disable the temporary cross-VPN communication path.

In response to the cross-VPN link setup request, the example IRR 130 of FIG. 1 sends targeted BGP route advertisements to the appropriate PE routers (e.g., the example PE routers 120 and 121 for a cross-VPN communication path between the VoIP devices 110 and 111) that configures the PE routers to create the cross-VPN communication path. The example IRR 130 sends a first targeted BGP route advertisement to PE 120 that causes the PE 120 to update its $VRF_Y$ table to include information concerning the VoIP device 111. The first targeted BGP route advertisement is directed and/or addressed to only the PE 120 and contains: (a) the IP address of the VoIP device 111, (b) routing information concerning how to route data to the VoIP device 111, and (c) the flow-spec parameter(s) contained in the cross-VPN link request message received from the VoIP call control processor 135. Likewise, example IRR 130 sends a second BGP route advertisement to PE 121 that causes the PE 121 to update its $VRF_X$ table to include information concerning VoIP device 110. The example PE routers 120 and 121 of FIG. 1 enforce the specified flow-spec parameters. Once the PE routers 120 and 121 have updated their VRF tables, the VoIP devices 110 and 111 may communicate using permitted communication protocols and/or services via the service provider network 115.

Figure 2:
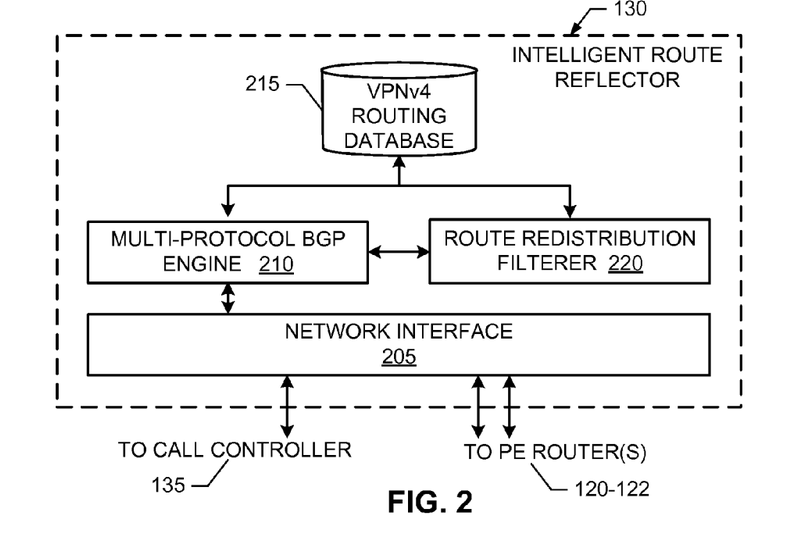
FIG. 2 illustrates an example manner of implementing a route reflector for the example MPLS-based network of FIG. 1.

FIG. 2 illustrates an example manner of implementing the example IRR 130 of FIG. 1. To implement one or more interfaces to the example PE routers 120-122 and/or the example VoIP call control processor 135, the example IRR 130 of FIG. 2 includes any type(s) and/or number of network interfaces, one of which is designated at reference numeral 205.

To send, receive and process BGP route advertisements, the example IRR 130 of FIG. 2 includes a multi-protocol BGP engine 210. When a BGP route advertisement is received from a PE router 120-122 via the example network interface 205, the example multi-protocol BGP engine 210 of FIG. 2 forwards the received BGP route advertisement to the other PE routers 120-122. The example multi-protocol BGP engine 210 also forwards the BGP route advertisement to the example VoIP call control processor 135, and stores the VPN routing information contained in the received BGP route advertisement in a VPNv4 routing database 215.

Routing information may be stored in the VPNv4 routing database 215 using any number and/or type(s) of data structures. The example VPNv4 routing database 215 of FIG. 2 may be implemented using any number and/or type(s) of memory(-ies), memory device(s) and/or storage device(s).

To identify the PE routers 120-122 required to implement a cross-VPN communication path, the example IRR 130 of FIG. 2 includes a route redistribution filterer 220. The example route redistribution filterer 220 of FIG. 2 uses a BGP community value contained in a cross-VPN link request message received from the example VoIP call control processor 135 to query the example VPNv4 routing database 215. The example route redistribution filterer 220 queries the VPNv4 routing database 215 to identify the PE router 120 associated with the VoIP device 110 and the PE router 121 associated with the VoIP device 111. The example multi-protocol BGP engine 210 of FIG. 2 sends a targeted BGP route advertisement to the PE routers identified by the example route redistribution filterer 220 to enable, configure and/or setup the requested cross-VPN communication path.

While an example IRR 130 has been illustrated in FIG. 2, one or more of the interfaces, data structures, elements, processes and/or devices illustrated in FIG. 2 may be combined, divided, re-arranged, omitted, eliminated and/or implemented in any other way. Further, the example network interface 205, the example multi-protocol BGP engine 210, the example VPNv4 routing database 215, the example route redistribution filterer 220, and/or, more generally, the example IRR 130 of FIG. 2 may be implemented by hardware, software, firmware and/or any combination of hardware, software and/or firmware. Thus, for example, any or the example network interface 205, the example multi-protocol BGP engine 210, the example VPNv4 routing database 215, the example route redistribution filterer 220, and/or, more generally, the example IRR 130 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example network interface 205, the example multi-protocol BGP engine 210, the example VPNv4 routing database 215, the example route redistribution filterer 220, and/or, more generally, the example IRR 130 are hereby expressly defined to include a tangible medium such as a memory, a digital versatile disc (DVD), a compact disc (CD), etc. storing the firmware and/or software. Further still, a route reflector may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
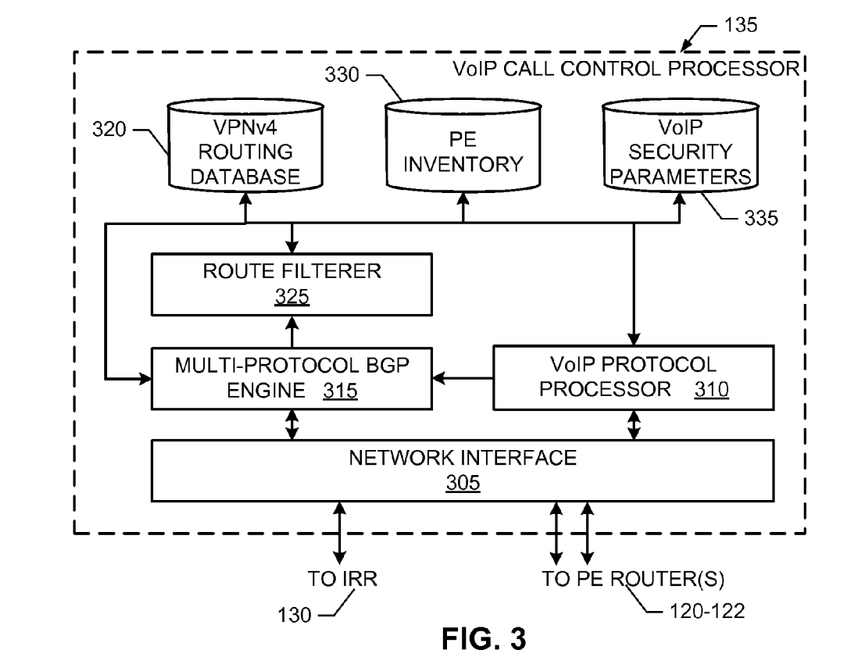
FIG. 3 illustrates an example manner of implementing an application server for the example MPLS-based network of FIG. 1.

FIG. 3 illustrates an example manner of implementing the example VoIP call control processor 135 of FIG. 1. To implement one or more interfaces to the example PE routers 120-122 and/or the example IRR 130, the example VoIP call control processor 135 of FIG. 3 includes any type(s) and/or number of network interfaces, one of which is designated at reference numeral 305.

To process VoIP protocol and/or signaling messages, the example VoIP call control processor 135 of FIG. 3 includes any number and/or type(s) of VoIP protocol processors, one of which is designated at reference numeral 310. The example VoIP protocol processor 310 of FIG. 3 handles and/or processes incoming and/or outgoing session initiation protocol (SIP) messages, and/or performs and/or carries out any other session border controller functionality. For example, example VoIP protocol processor 310 implements a state engine and/or maintains state information for SIP transactions, dialogs, and communication sessions.

To send, receive and process BGP route advertisements, the example VoIP call control processor 135 of FIG. 3 includes a multi-protocol BGP engine 315. When a BGP route advertisement is received from the example IRR 130 via the example network interface 305, the example multi-protocol BGP engine 315 of FIG. 3 stores the VPN routing information (e.g., PE router subnet information, PE router route targets, etc.) contained in the received BGP route advertisement in a VPNv4 routing database 320. Routing information may be stored in the VPNv4 routing database 320 using any number and/or type(s) of data structures. The example VPNv4 routing database 320 of FIG. 3 may be implemented using any number and/or type(s) of memory(-ies), memory device(s) and/or storage device(s).

To identify VoIP devices, the example VoIP call control processor 135 of FIG. 3 includes a route filterer 325. When a VoIP device announcement is received (e.g., a SIP REGISTER message) from a VoIP device via a PE router 120-122, the example route filterer 325 queries the VPNv4 database 320 to identify to which VPN the VoIP device belongs and to identify the PE router 120-122 via which the VoIP device is communicatively coupled to the service provider network 115. For example, when a VoIP device announcement is received from the example VoIP device 110 of FIG. 1, the example route filterer 325 identifies that the VoIP device 110 is associated with VPN and PE router 120. The example route filterer 325 stores a list of VoIP devices in the VPNv4 routing database 320.

To store a list of PE routers and associated BGP community values that can be used to uniquely identify each PE to the IRR 130, the example VoIP call control processor 135 includes a PE inventory 330. The example PE inventory 330 of FIG. 3 is pre-programmed and/or pre-provisioned with PE and BGP community values. The PE inventory 330 may be updated using any number of method(s) and/or protocol(s). The example PE inventory 330 of FIG. 3 may be implemented using any number and/or type(s) of data structures, and may be stored in any number and/or type(s) of memory(-ies), memory device(s) and/or storage device(s).

To store flow-spec parameters to be enforced for cross-VPN communication paths, the example VoIP call control processor 135 of FIG. 3 includes a VoIP security parameters database 335. The example VoIP security parameters database 335 of FIG. 3 may be implemented using any number and/or type(s) of data structures, and may be stored in any number and/or type(s) of memory(-ies), memory device(s) and/or storage device(s).

While an example VoIP call control processor 135 has been illustrated in FIG. 3, one or more of the interfaces, data structures, elements, processes and/or devices illustrated in FIG. 3 may be combined, divided, re-arranged, omitted, eliminated and/or implemented in any other way. Further, the example network interface 305, the example VoIP protocol processor 310, the example multi-protocol BGP engine 315, the example VPNv4 routing database 320, the example route filterer 325, the example PE Inventory 330, the example VoIP security parameters 335 and/or, more generally, the example VoIP call control processor 135 of FIG. 3 may be implemented by hardware, software, firmware and/or any combination of hardware, software and/or firmware. Thus, for example, any or the example network interface 305, the example VoIP protocol processor 310, the example multi-protocol BGP engine 315, the example VPNv4 routing database 320, the example route filterer 325, the example PE Inventory 330, the example VoIP security parameters 335 and/or, more generally, the example VoIP call control processor 135 may be implemented by one or more circuit(s), programmable processor(s), ASIC(s), PLD(s) and/or FPLD(s), etc. When any of the appended claims are read to cover a purely software and/or firmware implementation, at least one of the example network interface 305, the example VoIP protocol processor 310, the example multi-protocol BGP engine 315, the example VPNv4 routing database 320, the example route filterer 325, the example PE Inventory 330, the example VoIP security parameters 335 and/or, more generally, the example VoIP call control processor 135 are hereby expressly defined to include a tangible medium such as a memory, a DVD, a CD, etc. storing the firmware and/or software. Further still, an application server may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
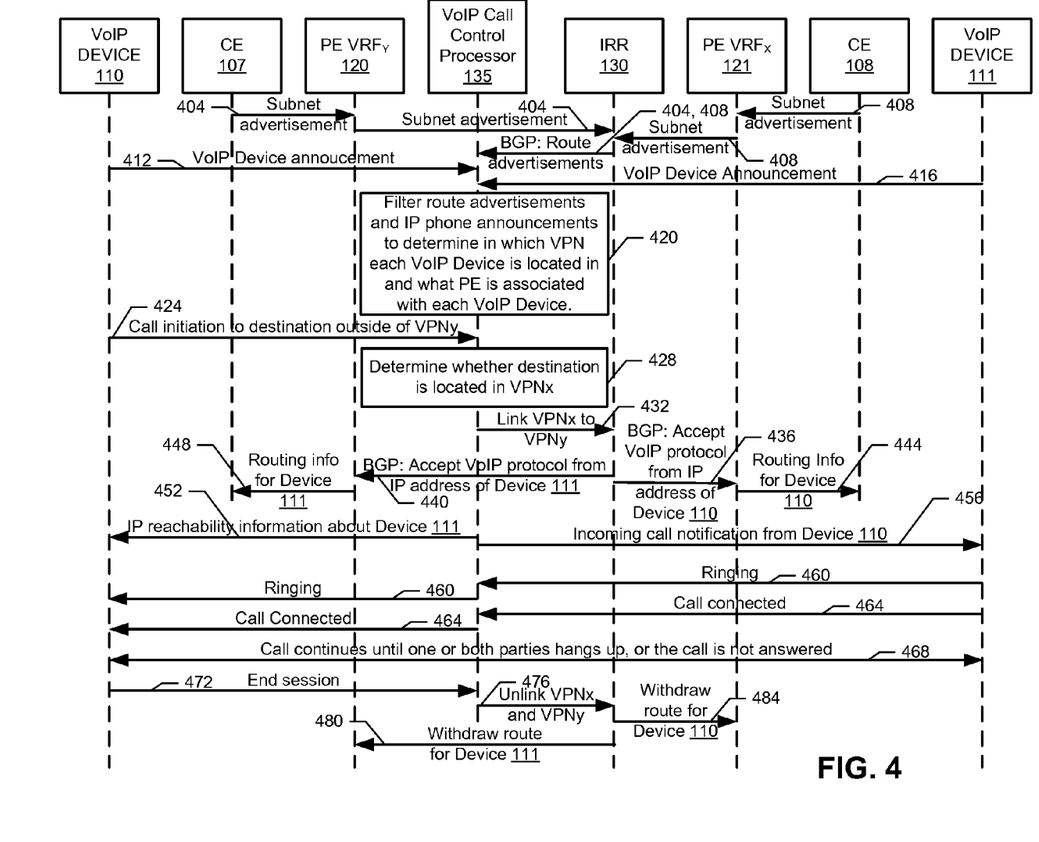
FIG. 4 illustrates an example protocol message exchange that may be used to implement the example MPLS-based network of FIG. 1.

FIG. 4 illustrates an example protocol message exchange that may be implemented by the example MPLS-based network 100 of FIG. 1. The example exchange of FIG. 4 begins with the CE routers 107 and 108 (FIG. 1) sending respective subnet advertisements 404 and 408 to their associated PE routers 120 and 121. The subnet advertisements 404 and 408 of FIG. 4 contain one or more values that identify which IP subnets are associated with the corresponding CE routers 107 and 108. The PE routers 120 and 121 each forward their respective subnet advertisement 404, 408 to the IRR 130. The IRR 130 forwards the subnet advertisements 404, 408 to the VoIP call control processor 135.

In the illustrated example of FIG. 4, each of the VoIP devices 110 and 111 sends a respective VoIP device announcement (e.g., a SIP REGISTER message) 412, 416 to the VoIP call control processor 135. Using the subnet advertisements 404 and 408 and the VoIP device announcements 412 and 416, the VoIP call control processor 135 populates the example VPNv4 routing database 320 (FIG. 3) (block 420). The VoIP call control processor 135 adds each of the VoIP devices 110 and 111 to the VPNv4 routing database 320 together with its assigned IP address, a first value that represents a VPN and a second value that identifies the PE router 120, 121 associated with the VoIP device 110, 111.

When a call initiation request 424 is received from VoIP device 110, the VoIP call control processor 135 determines whether the call initiation request is directed to a VoIP device of a different VPN (e.g., the VoIP device 111 associated with $VPN_X$) (block 428). In the illustrated example of FIG. 4, the call initiation request 424 is directed to the VoIP device 111, and the VoIP call control processor 135 sends a cross-VPN link setup request 432 to the IRR 130.

In response to the cross-VPN link setup request 432, the IRR 130 sends a first targeted BGP route advertisement 436 to the PE 121 that directs the PE 121 to allow the VoIP device 110 to communicate with the VoIP device 111 using a VoIP protocol. Likewise, IRR 130 sends a second targeted BGP route advertisement 440 to the PE 121 that directs the PE 120 to allow the VoIP device 111 to communicate with the VoIP device 110 using a VoIP protocol. The PE router 121 updates its $VRF_X$ table to include routing information for the VoIP device 110 and sends routing information 444 for the VoIP device 110 to the CE router 108. Likewise, the PE router 120 updates its $VRF_Y$ table to include routing information for the VoIP device 111 and sends routing information 448 for the VoIP device 111 to the CE router 107.

The VoIP call control processor 135 responds to the VoIP device 110 with reachability information 452 for the VoIP device 111, and notifies 456 the VoIP device 111 of the incoming call from VoIP device 110. The VoIP device 111 responds with a SIP RINGING message 460, which the VoIP call control processor 135 forwards to the VoIP device 110. When the VoIP device 111 is answered, the VoIP device 111 sends a call connected message 464, which the VoIP call control processor forwards to the VoIP device 110.

A VoIP communication session 468 is established and used by the VoIP devices 110 and 111 to communicate until either the VoIP device 110 and/or the VoIP device 111 is hung up. In the illustrated example of FIG. 4, the VoIP device 110 is hung up and the VoIP device 110 sends an end session message 472. The VoIP call control processor 135 sends a cross-VPN link termination request message 476 to the IRR 130, which sends a BGP route withdraw advertisement 480, 484 to respective ones of the PE routers 120 and 121.

If the VoIP device 111 had not been answered, the VoIP call control processor 135 would have sent the cross-VPN link termination request 476 to the IRR 130 without the VoIP communication session 468 being established.

Figure 5:
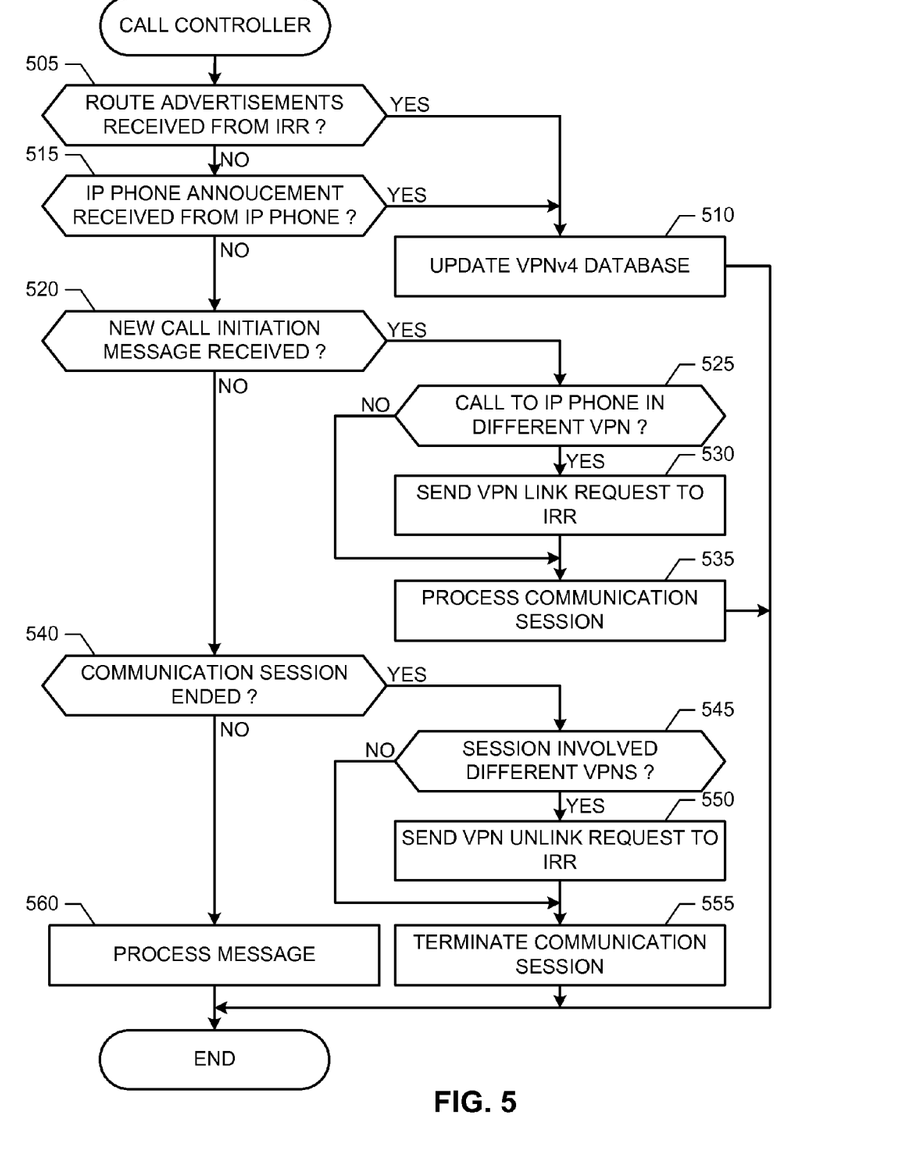
FIG. 5 is a flowchart representative of example machine-accessible instructions that may be executed by, for example, a processor to implement any or all of the example application servers of FIGS. 1 and 3.
Figure 6:
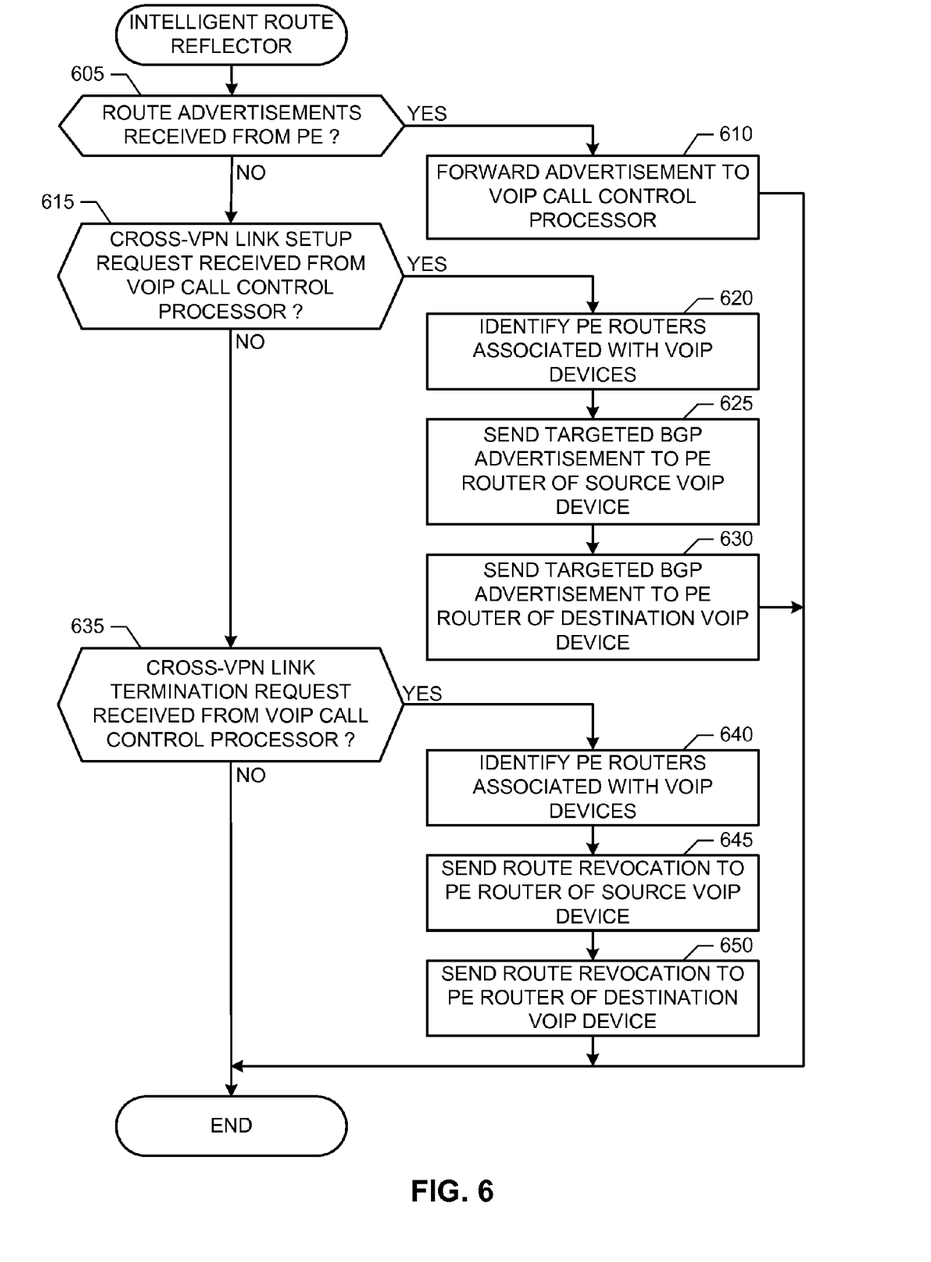
FIG. 6 is a flowchart representative of example machine-accessible instructions that may be executed by, for example, a processor to implement any or all of the example route reflectors of FIGS. 1 and 2.

FIG. 5 illustrates example machine-accessible instructions that may be executed to implement the example VoIP call control processor 135 of FIG. 1 and/or FIG. 3. FIG. 6 illustrates example machine-accessible instructions that may be executed to implement the example IRR 130 of FIG. 1 and/or FIG. 2. The example machine-accessible instructions of FIGS. 5 and/or 6 may be carried out by a processor, a controller and/or any other suitable processing device. For example, the example machine-accessible instructions of FIGS. 5 and/or 6 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general-purpose or special-purpose computer, or other machine with a processor (e.g., the example processor platform P100 discussed below in connection with FIG. 7). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example machine-accessible instructions of FIGS. 5 and/or 6 may be implemented using any combination(s) of ASIC(s), PLD(s), FPLD(s), discrete logic, hardware, firmware, etc. Also, some or all of the example machine-accessible instructions of FIGS. 5 and/or 6 may instead be implemented manually or as any combination of any of the foregoing techniques, for example, any combination of firmware, software, discrete logic and/or hardware. Further, many other methods of implementing the example operations of FIGS. 5 and/or 6 may be employed. For example, the order of execution of the blocks may be changed, and/or one or more of the blocks described may be changed, eliminated, sub-divided, or combined. Additionally, any or all of the example machine-accessible instructions of FIGS. 5 and/or 6 may be carried out sequentially and/or carried out in parallel by, for example, separate processing threads, processors, devices, discrete logic, circuits, etc.

The example machine-accessible instructions of FIG. 5 begin when the example VoIP call control processor 135 (FIG. 1) receives a message. If a BGP route advertisement was received from the example IRR 130 (block 505), the example multi-protocol BGP engine 315 (FIG. 3) updates VPN routing information in the VPNv4 routing database 320 (block 510). Control then exits from the example machine-accessible instructions of FIG. 5.

If a VoIP device announcement was received (block 515), the example route filterer 325 (FIG. 3) determines to which VPN and which PE router the announced VoIP device belongs and updates the VPNv4 routing database 320 (block 510). Control then exits from the example machine-accessible instructions of FIG. 5.

If a new communication session initiation request message is received (block 520), the VoIP protocol processor 310 (FIG. 3) determines whether the request is directed to a VoIP device of a different VPN (block 525). If the request is directed to a VoIP device of a different VPN (block 525), the multi-protocol BGP engine 315 sends a cross-VPN link setup request to the IRR 130 (FIG. 1) (block 530). The VoIP protocol processor 310 continues processing the request VoIP communication session in accordance with any past, present and/or future VoIP protocol, specification and/or standard (block 535). Control then exits from the example machine-accessible instructions of FIG. 5. Returning to block 525, if the request is not directed to a VoIP device of a different VPN (block 525), control proceeds to block 535 without sending a cross-VPN link setup request to the IRR 130.

If a communication session message is received (block 540), the VoIP protocol processor 310 (FIG. 3) determines whether the communication session was between VoIP devices of different VPNs (block 545). If the communication session was between VoIP devices of different VPNs (block 545), the multi-protocol BGP engine 315 sends a cross-VPN link termination request to the IRR 130 (FIG. 1) (block 550). The VoIP protocol processor 310 continues processing the communication session end message in accordance with any past, present and/or future VoIP protocol, specification and/or standard (block 555). Control then exits from the example machine-accessible instructions of FIG. 5. Returning to block 525, if the communication session was not between VoIP devices of different VPNs (block 545), control proceeds to block 555 without sending a cross-VPN link termination request to the IRR 130.

If any other type of message is received (block 540), the VoIP protocol processor processes the message in accordance with any past, present and/or future VoIP protocol, specification and/or standard (block 560). Control then exits from the example machine-accessible instructions of FIG. 5.

The example machine-accessible instructions of FIG. 6 begin when a message is received at the example IRR 130 of FIG. 1. If the received message is a route advertisement message from a PE router 120-122 (block 605), the multi-protocol BGP engine 210 (FIG. 2) forwards the route advertisement to the VoIP call control processor 135 (block 610). Control then exits from the example machine-accessible instructions of FIG. 6.

If a cross-VPN link setup request is received from the VoIP call control processor 135 (block 615), the example route redistribution filterer 220 (FIG. 2) identifies the PE routers associated with the source and destination VoIP devices (block 620). The example multi-protocol BGP engine 210 sends a first targeted BGP route advertisement to the PE router associated with the source VoIP device (block 625) and sends a second targeted BGP route advertisement to the PE router associated with the destination VoIP device (block 630). Control then exits from the example machine-accessible instructions of FIG. 6.

If a cross-VPN link termination request is received from the VoIP call control processor 135 (block 635), the example route redistribution filterer 220 (FIG. 2) identifies the PE routers associated with the source and destination VoIP devices (block 640). The example multi-protocol BGP engine 210 sends a first targeted BGP route withdraw advertisement to the PE router associated with the source VoIP device (block 645) and sends a second targeted BGP route withdraw advertisement to the PE router associated with the destination VoIP device (block 650). Control then exits from the example machine-accessible instructions of FIG. 6.

Figure 7:
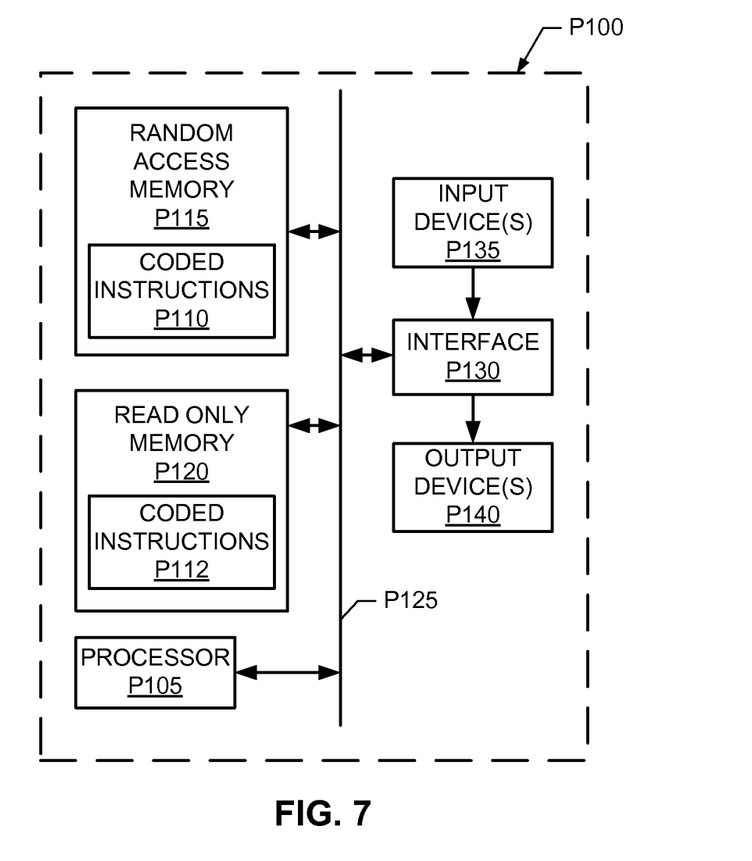
FIG. 7 is a schematic illustration of an example processor platform that may be used and/or programmed to carry out the example machine-accessible instructions of FIGS. 5 and/or 6, and/or to implement any or all of the example methods and apparatus described herein.

FIG. 7 is a schematic diagram of an example processor platform P100 that may be used and/or programmed to implement either or both of the example IRR 130 and/or the example VoIP call control processor 135 of FIGS. 1, 2 and/or 3. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 5 and/or 6 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example VPNv4 routing database 215, the example VPN routing database 320, the example PE inventory 330, and/or the example VoIP security parameters 335 of FIGS. 2 and 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example network interfaces 205 and/ or 305 of FIGS. 2 and 3.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   sending a first border gateway protocol route advertisement to a first provider edge router associated with a first one of two multiprotocol label switched-based virtual private networks in response to receiving a cross-virtual private network link setup request from an application server, the setup request identifying a communication path between two user devices associated with the first and second multiprotocol label switched-based virtual private networks;
   sending a second border gateway protocol route advertisement to a second provider edge router associated with the second multiprotocol label switched-based virtual private network; and
   restricting a communication session between the two user devices of the first and second multiprotocol label switched-based virtual private networks to a first protocol for a threshold period of time based on a restriction parameter shared by the communication path.

2. A method as defined in claim 1, wherein the first border gateway protocol route advertisement comprises:
   a first value representative of a first Internet protocol address assigned to a first of the two user devices;
   a second value representative of a second Internet protocol address assigned to a second of the two user devices; and
   a third value representative of a flow-spec parameter.

3. A method as defined in claim 1, wherein the first border gateway protocol route advertisement identifies a cross-virtual private network communication path over which the two user devices are permitted to communicate.

4. A method as defined in claim 3, wherein the first border gateway protocol route advertisement further identifies a second protocol that may be used by the two user devices over the identified cross-virtual private network communication path.

5. A method as defined in claim 1, further comprising:
   receiving a cross-virtual private network link termination request from the application server;
   sending a first border gateway protocol route withdrawal advertisement to the first provider edge router; and
   sending a second border gateway protocol route withdrawal advertisement to the second provider edge router.

6. A method as defined in claim 1, further comprising identifying the first and second provider edge routers based on a community value contained in the cross-virtual private network link setup request.

7. A method as defined in claim 1, further comprising determining a provider edge router next hop based on the first or second border gateway protocol route advertisement.

8. An apparatus comprising:
   a memory comprising machine readable instructions; and
   a processor to execute the instructions to perform operations comprising:
      sending a first border gateway protocol route advertisement to a first provider edge router associated with a first one of two multiprotocol label switched-based virtual private networks in response to receiving a cross-virtual private network link setup request from an application server, the setup request identifying a communication path between two user devices associated with the first and second multiprotocol label switched-based virtual private networks;
      sending a second border gateway protocol route advertisement to a second provider edge router associated with the second multiprotocol label switched-based virtual private network; and
      restricting a communication session between the two user devices of the first and second multiprotocol label switched-based virtual private networks to a first protocol for a threshold period of time based on a restriction parameter shared by the communication path.

9. An apparatus as defined in claim 8, wherein the operations further comprise:
   assigning a first value representative of a first Internet protocol address to a first of the two user devices;
   assigning a second value representative of a second Internet protocol address to a second of the two user devices; and
   assigning a third value representative of a flow-spec parameter.

10. An apparatus as defined in claim 8, wherein the operations further comprise identifying a cross-virtual private network communication path over which the two user devices are permitted to communicate.

11. An apparatus as defined in claim 10, wherein the operations further comprise identifying one or more second protocols that may be used by the two user devices over the identified cross-virtual private network communication path.

12. An apparatus as defined in claim 8, wherein the operations further comprise:
    receiving a cross-virtual private network link termination request from the application server;
    sending a first border gateway protocol route withdrawal advertisement to the first provider edge router; and
    sending a second border gateway protocol route withdrawal advertisement to the second provider edge router.

13. An apparatus as defined in claim 8, wherein the operations further comprise identifying the first and second provider edge routers based on a community value contained in the cross-virtual private network link setup request.

14. An apparatus as defined in claim 8, wherein the operations further comprise determining a provider edge router next hop based on the first or second border gateway protocol route advertisement.

15. A tangible machine readable storage device comprising instructions which, when executed, cause a machine to perform a method comprising:
    sending a first border gateway protocol route advertisement to a first provider edge router associated with a first one of two multiprotocol label switched-based virtual private networks in response to receiving a cross-virtual private network link setup request from an application server, the setup request identifying a communication path between two user devices associated with the first and second multiprotocol label switched-based virtual private networks;
    sending a second border gateway protocol route advertisement to a second provider edge router associated with the second multiprotocol label switched-based virtual private network; and restricting a communication session between the two user devices of the first and second multiprotocol label switched-based virtual private networks to a first protocol for a threshold period of time based on a restriction parameter shared by the communication path.

16. A machine readable storage device as defined in claim 15, wherein the method further comprises: assigning a first value representative of a first Internet protocol address to a first of the two user devices; assigning a second value representative of a second Internet protocol address to a second of the two user devices; and assigning a third value representative of a flow-spec parameter.

17. A machine readable storage device as defined in claim 15, wherein the method further comprises identifying a cross-virtual private network communication path over which the two user devices are permitted to communicate.

18. A machine readable storage device as defined in claim 17, wherein the method further comprises identifying one or more second protocols that may be used by the two user devices over the identified cross-virtual private network communication path.

19. A machine readable storage device as defined in claim 15, wherein the method further comprises: receiving a cross-virtual private network link termination request from the application server; sending a first border gateway protocol route withdrawal advertisement to the first provider edge router; and sending a second border gateway protocol route withdrawal advertisement to the second provider edge router.

20. A machine readable storage device as defined in claim 15, wherein the method further comprises identifying the first and second provider edge routers based on a community value contained in the cross-virtual private network link setup request.

* * * * *